April 16, 1929.    L. G. TUBBS    1,709,695
INDUCTION REGULATOR
Filed Dec. 13, 1927
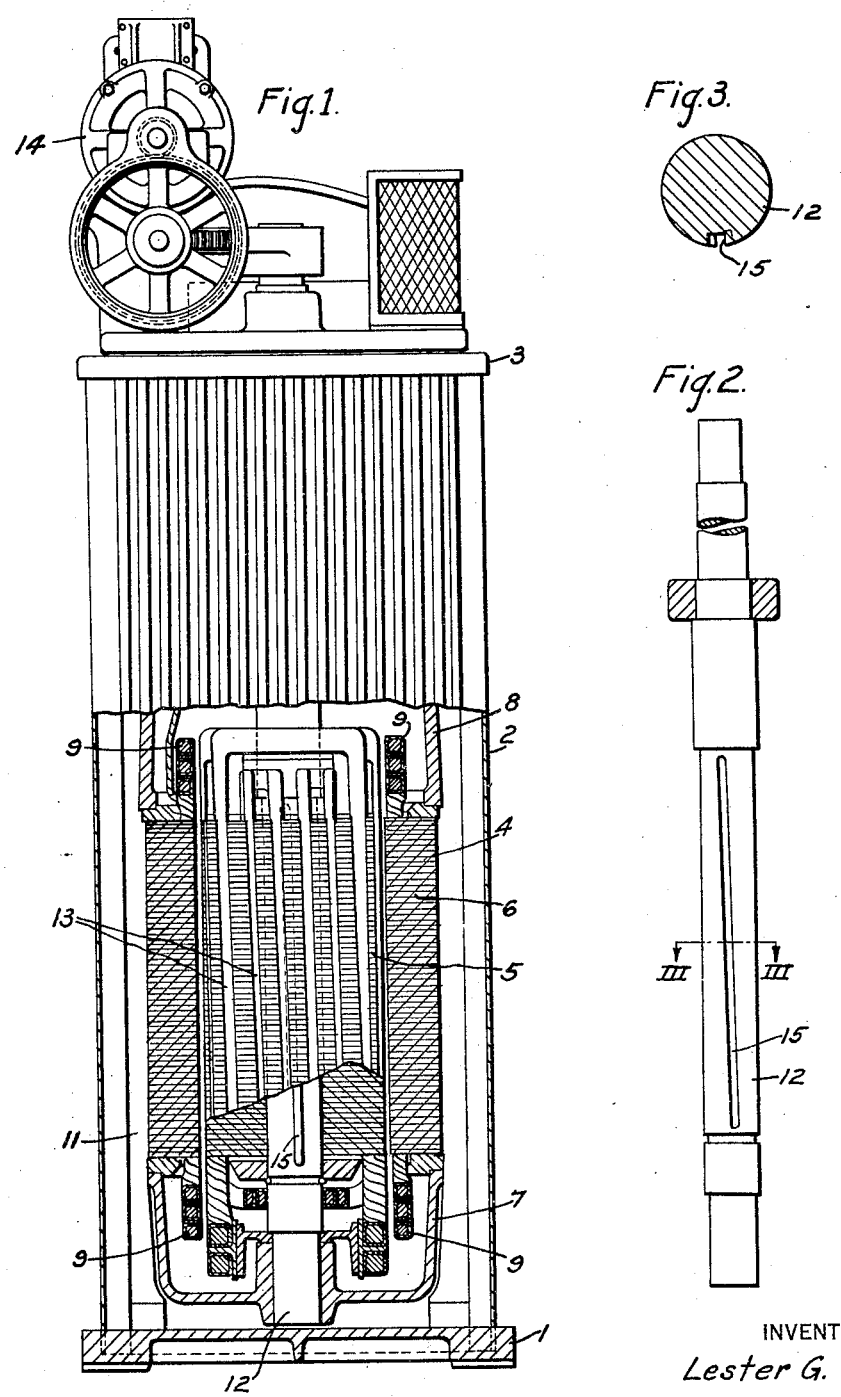
INVENTOR
Lester G. Tubbs
BY
ATTORNEY Patented Apr. 16, 1929.

1,709,695

UNITED STATES PATENT OFFICE.

LESTER G. TUBBS, OF PITTSBURGH, PENNSYLVANIA, ASSIGNOR TO WESTINGHOUSE ELECTRIC & MANUFACTURING COMPANY, A CORPORATION OF PENNSYLVANIA.

INDUCTION REGULATOR.

Application filed December 13, 1927. Serial No. 239,722.

My invention relates to regulators of the induction type, and more particularly to the relation of the conductors comprising the primary and secondary windings of the regulator.

In a voltage feeder regulator of the induction type there are provided relatively movable primary and secondary windings wound upon cores formed of laminations of punched magnetic material. One of these windings is connected in shunt relation to, and the other winding is connected in series relation with, the circuit to be regulated. The movable winding is operatively connected to a shaft that is actuated by an electric motor energized in accordance with the operation of a contact making voltmeter which is connected to the circuit being regulated. The motor operates the rotor of the induction regulator to position the movable winding of the regulator to "buck", or "boost", the voltage of the stationary winding and thereby maintain the voltage of the circuit at the desired value.

It is customary in the manufacture of induction regulators to construct them with a small number of magnetic poles, say two or four poles, and to utilize a relatively small number of teeth between which the rotor and stator conductors are placed. The rotor of the regulator is substantially stationary, and its movements when operated are generally slight variations in the rotor position to correct for a variation of the circuit voltage. In certain positions of the rotor or movable element of an induction regulator, with respect to the stator or stationary element, there is set up an intermittent torque on the rotor of the regulator caused by uneven distribution of the magnetic flux at the tooth tips. This intermittent torque at certain rotor positions often causes a torsional vibration that is difficult to overcome. In an induction regulator the tooth torque varies with applied frequency and differs in this respect from rotating apparatus wherein the frequency of rotation is a large factor.

An object of my invention is to eliminate, or reduce, the torsional vibration of an induction regulator caused by the uneven distribution of magnetic flux at the tooth tips.

To accomplish this result, I assemble the punchings of one of the magnetic structures, either the stator or rotor structure, so that the slots accommodating the conductors will be skewed, or in the form of a helix. The circumferential displacement of one end of the slot from the other end should be at least equal to the maximum slot pitch of either the rotor or stator punchings. This construction will so distribute the torque caused by torsional vibration of the shaft that the net torque from this cause is practically zero.

In the drawing:

Figure 1 illustrates an induction regulator, partly in section and partly in side elevation, having the rotor winding skewed in accordance with my invention;

Fig. 2 illustrates the rotor shaft showing the keyway as being skewed, or in the form of a helix; and Fig. 3 is a section of the rotor shaft.

Referring to the drawing, the induction regulator is mounted within a tank having a base 1, a side shell 2 and a top 3 and comprises a stator element 4 and a rotor element 5. The stator element consists of a magnetic structure made up of a series of iron laminations 6 punched to the desired shape, supported on a bracket 7 and held in place by a bracket 8. The laminations of magnetic material are so shaped as to provide slots through which pass electric conductors forming the stator windings, or secondary coils, 9 of the regulator.

The rotor comprises a magnetic structure formed of a series of iron laminations or punchings 11, keyed to a shaft 12 to rotate therewith, and provided with slots through which pass electric conductors forming the rotor windings or primary coils 13 of the regulator. The lower end of the shaft 12 is mounted in a bearing in the lower bracket 7, and the upper end of the shaft extends through the cover of the tank and is geared to be actuated by a motor 14 in a well-known manner.

A regulator built in accordance with my invention differs from the usual structure in that the conductors forming one of the windings of the regulator are skewed with respect to the conductors forming the other windings of the regulator. For example, as illustrated in Figs. 1 and 2 of the drawing, the shaft 12 is provided with a key slot 15 that is skewed, or in the form of a helix about the axis of the shaft. The laminated punchings forming the magnetic core of the rotor are similar in shape and are so disposed along the rotor shaft that the conductor slots in the outer portion of the core structure are helical. The rotor conductors therefore have an angular displacement at one end with respect to the other end corresponding to the curve of the helix.

Modifications in the structure illustrated may be made within the spirit of my invention and I do not wish to be limited other than by the scope of the appended claims.

I claim as my invention:

1. In a regulator of the induction type, a plurality of conductors arranged to form a stator winding, a plurality of conductors arranged to form a rotor winding, the conductors of one of said windings being skewed with respect to the conductors of the other of said windings to thereby reduce the torsional vibration of the rotor.

2. In a regulator of the induction type, a plurality of conductors connected to form a stator winding, and a plurality of conductors connected to form a rotor winding, the two windings nesting about a common axis, the conductors of one of said windings being arranged parallel to, and the conductors of the other of said windings being skewed with respect to the axis of said windings.

3. In a regulator of the induction type, a plurality of conductors connected to form a stator winding, a plurality of conductors connected to form a rotor winding, said conductors being arranged about a common axis, the conductors forming the stator winding being parallel to said axis, and the conductors forming the rotor winding being arranged helically about said axis.

4. In a regulator of the induction type, a rotor element and a stator element therefor, each element comprising a series of punchings of magnetic material provided with conductor carrying slots, the slots of one element being skewed with respect to the slots of the other element.

In testimony whereof, I have hereunto subscribed my name this 8th day of December 1927.

LESTER G. TUBBS.